Oct. 18, 1960  A. EISELE  2,956,342
PRECISION CONCENTRICITY GAUGE
Filed May 16, 1958  2 Sheets-Sheet 1

INVENTOR.
ANDREW EISELE
BY Barthel + Bugbee
ATTY'S.

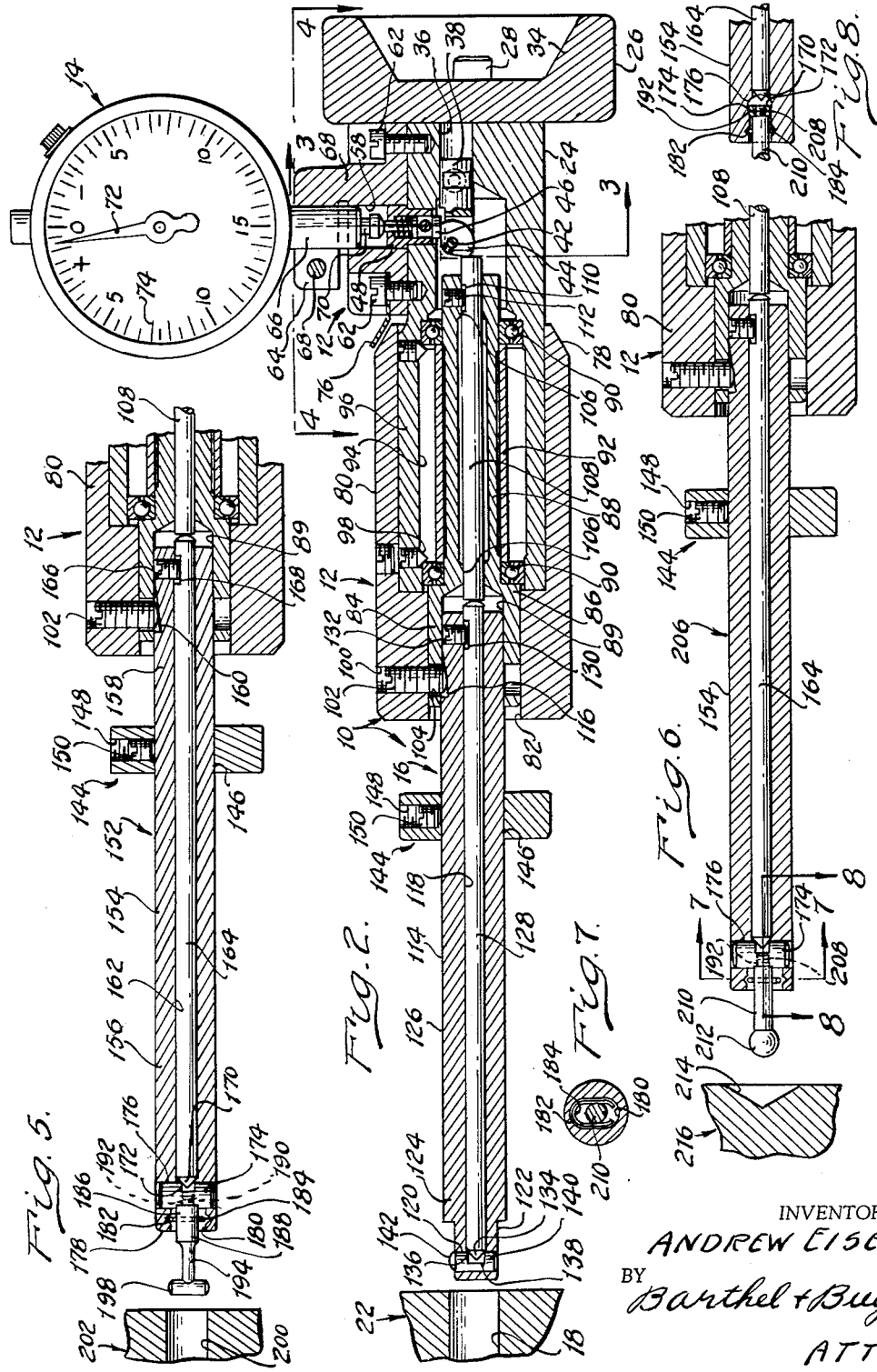

United States Patent Office 2,956,342
Patented Oct. 18, 1960

2,956,342
PRECISION CONCENTRICITY GAUGE

Andrew Eisele, 15025 Cheyenne Ave., Detroit 27, Mich.

Filed May 16, 1958, Ser. No. 735,764

12 Claims. (Cl. 33—174)

This invention relates to bore gauges and, in particular, to bore concentricity gauges.

One object of this invention is to provide a bore concentricity gauge by the aid of which the accuracy of concentricity of a bore in a workpiece may be precisely determined relative to a counterbore or related bore and any deviation from concentricity accurately measured.

Another object is to provide a bore concentricity gauge of the foregoing character wherein the concentricity or lack of concentricity is determined by a dial indicator which with its holder is adapted to remain stationary in the most convenient position for reading its scale while the measuring head and stem which enter the bores are rotated relatively to the dial indicator holder.

Another object is to provide a bore concentricity gauge of the foregoing character wherein the dial indicator holder is provided with a pointer which registers with a circular or arcuate scale on the barrel by which the measuring head and stem are rotated relatively to the holder, so that the exact location of any abnormality in the bore, as indicated in amount on the dial indicator scale, is shown by the position of the pointer on the barrel scale.

Another object is to provide a bore concentricity gauge as set forth in the preceding objects, wherein the barrel is elongated and rotatably mounted on the holder for convenience of grasping, so that it and the bore measuring unit consisting of the measuring head, stem and motion-transmitting mechanism are quickly and precisely rotated to measure the concentricity and regularity of the bores.

Another object is to provide a bore concentricity gauge of the foregoing character wherein the rotary barrel is adapted to detachably receive interchangeable measuring units adapted for the measurement of bores of different diameters, so that with a single holder and dial indicator together with a set of bore measuring units, the owner or operator is enabled to measure the concentricity of a wide variety and range of bores.

Another object is to provide a bore concentricity gauge of the foregoing character which is extremely sensitive, easy to operate and by reason of the elongated and preferably knurled barrel is conveniently manipulated to give rapid and accurate bore concentricity and regularity measurements.

Another object is to provide a bore gauge having a hollow stem extending into the bore to be gauged, the stem including a transversely reciprocable measuring pin mounted near the outer end of the stem and a longitudinally-recpirocable motion-transmitting rod mounted within the stem and having a conically-pointed outer end engageable with a sharp edge on the measuring pin intermediate its opposite ends, thereby greatly increasing the accuracy and uniformity of reading of the gauge not only in original manufacture but also in readjustment after the occurrence of wear, by reason of the ease of grinding or regrinding the sharp edge and, if necessary, of the conically-pointed outer end of the motion-transmitting rod, in contrast to prior gauges having motion-converting surface-to-surface engagement as well as giving and maintaining uniformity of reading when the motion-transmitting rod and measuring pin are also rotated relatively to one another in measuring the bore around all or a part of its circumference.

Other objects and advantages of the invention will become apparent during the course of the following description of the accompanying drawings, wherein:

Figure 2 is a central longitudinal vertical section through the bore concentricity gauge of Figure 1, with the dial indicator shown in side elevation;

Figure 5 is a fragmentary central vertical longitudinal section of a modified bore measuring unit used in the bore concentricity gauge of Figures 1 to 4 inclusive;

Figure 6 is a fragmentary central vertical longitudinal section of a further modified bore measuring unit used in the bore concentricity gauge of Figures 1 to 4 inclusive;

Figure 7 is a cross-section taken along the line 7—7 in Figure 6; and

Figure 8 is a fragmentary central horizontal longitudinal section taken along the line 8—8 in Figure 6.

Figure 1:
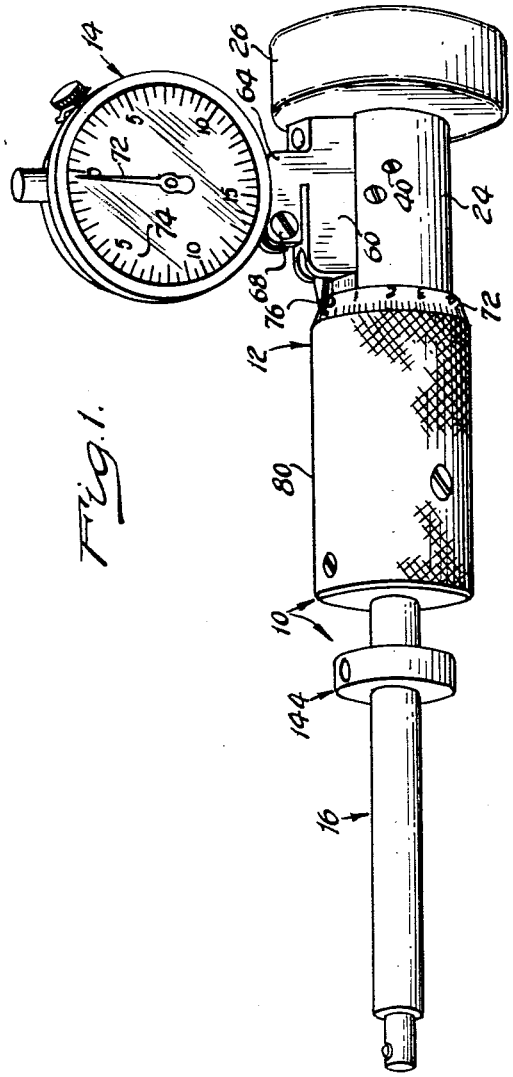
Figure 1 is a perspective view, mainly in side elevation, of a bore concentricity gauge, according to one form of the invention.
Figure 4:
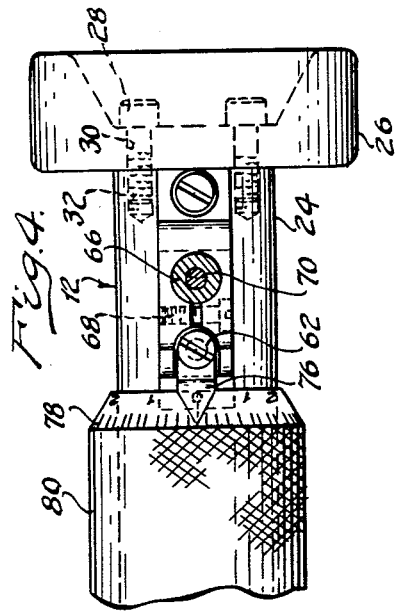
Figure 4 is a horizontal section mainly in a fragmentary top plan view, taken along the line 4—4 in Figure 2; showing the dial indicator holder and pointer registering with the rotating barrel scale for the bore measuring unit.
Figure 3:
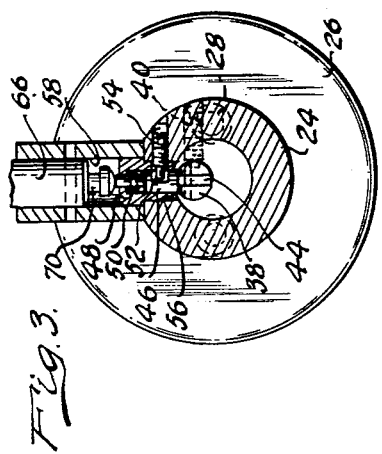
Figure 3 is a cross-section taken along the line 3—3 in Figure 2, showing the motion-transmitting mechanism adjacent the dial indicator plunger.

Referring to the drawings in detail, Figures 1 to 4 inclusive show a bore concentricity gauge, generally designated 10, according to one form of the invention as consisting generally of a measurement indicating unit 12 upon which is mounted a conventional dial indicator 14 and a bore concentricity measuring unit 16. The measurement indicating unit 12 interchangeably receives any one of a set of such bore measuring units 16, different sizes thereof being provided in the set for measuring the concentricity of different diameters of bores 18 relatively to a counterbore (not shown) in a workpiece, generally designated 22, or relatively to a bore in a fixture (not shown) with which the bore 18 is intended to be coaxial. Such a fixture, for example, is shown in the Eisele Patent No. 2,831,258 of April 22, 1958, for Precision Eccentricity Gauge.

The dial indicator holder or measurement indicating unit 12 includes a hollow cylindrical body or support 24 to one end of which is attached a circular hand grip 26 by means of a pair of so-called Allen screws 28 (Figures 2 and 4) threaded through holes 30 in the hand grip 26 into threaded holes 32 in the support 24, the hand grip 26 being provided with a recess 34 containing the heads of the screws 28 and also providing a firm and precise grip for the hand which holds the hand grip 26 during use of the concentricity gauge 10.

The hollow cylindrical support 24 is provided at the end adjacent the hand grip 26 with a bore 36 in which is seated one end of a short pin 38 (Figure 2) held in position by means of a set screw 40 (Figure 3) engaging a flattened portion thereof. The forward end of free end of the pin 38 is slotted and drilled transversely to receive a pivot screw or pin 42 (Figure 2) upon which is pivotally mounted a motion-transmitting quadrant 44 having an extent slightly greater than 90 degrees. Engaging one side of the quadrant 44 is the lower end of a motion-transmitting pin 46 (Figure 3) which is reciprocably mounted in a tubular plug 48 containing a compression spring 50 which urges the head of the pin 46 downwardly into engagement with the quadrant 44, the head of the pin 46 being slotted as at 52 to receive the end of a stop screw 54 threaded into the cylindrical support 24 to limit the extent of reciprocation of the pin 46. The tubular plug 48 in turn is seated in a vertical bore 56 in the top of the cylindrical support 24 and its enlarged upper end is in turn seated in a vertical bore 58 (Figures 2 and 3) in an upstanding dial indicator receiving bracket 60 which is secured to the cylindrical support 24 by set screws 62. The bracket 60 has a slotted L-shaped arm 64 containing a continuation of the bore 58 and receiving the stem 66 of the conventional dial indicator 14, the stem 66 being held in position by a clamping screw 68 extending across the slotted end of the arm 64. The dial indicator stem has the usual reciprocable plunger 70 engaged by the pin 46 and connected by motion-multiplying mechanism to the needle 72 registering with the circular scale 74, graduated in dimensional units such as thousandths of an inch.

The heads of the set screws 62 are recessed into the bracket 60, and the forward screw 62 also secures to the bracket 60 a bent pointer 76 constituting an index element. The pointer 76 registers with a circular or arcuate divided scale 78 on the beveled rearward end of a sleeve portion of an elongated knurled barrel 80 constituting a handle of hollow cylindrical form having at its forward end a bore 82 engaging the enlarged forward end 84 of a rotary tubular measuring unit carrier 86 having a reduced diameter rearward end portion 88. The forward end portion 84 has a bore 89 therein constituting a chuck for receiving the measuring units 16. The reduced diameter rearward end portion 88 of the measuring unit carrier 86 has mounted thereon the inner races of axially-spaced anti-friction ball bearings 90 separated from one another by a spacing sleeve 92 (Figure 2). The outer races of the ball bearings 90 are held in assembly within the forward enlarged bore 94 of the forward enlarged tubular end portion 96 of the hollow support 24 by conical-ended set screws 98 carried by the end portion 96 which is drilled and threaded for that purpose. In this manner, the barrel 80 is rotatably mounted relatively to the tubular forward end portion 96 of the support 24.

The hollow support 24 near its forward end is provided with a threaded radial hole 100. The hole 100 receives a coupling screw 102 which also passes through a radial hole 104 in the forward end of the forward enlarged diameter portion 84 of the measuring unit carrier 86 into engagement with the measuring unit 16, as described more fully below. The rearward or reduced diameter portion 88 of the measuring unit carrier 86 is provided with spaced aligned bearing bores 106 (Figure 2) which receive and reciprocably support a rearward motion-transmitting rod 108. The latter is recessed at 110 to receive the end of a stop screw 112 threaded radially through the rearward end portion of the tubular measuring unit carrier 86 to limit the reciprocation of the rod 108, the rearward end of which engages the quadrant 44 on its remaining side. In actuality, although too fine a detail to be clearly shown in the drawings, the fact that the sides of the quadrant 44 are disposed at an obtuse angle to one another slightly greater than 90 degrees causes their sharp peripheral corners only to engage approximately the midportions of the pin 46 and rearward end of the rod 108, thereby providing precise knife-edge corners on the quadrant 44 to engage the flat adjacent ends of the pin 46 and motion-transmitting rod 108.

Each measuring unit 16 of the set of measuring units of different diameters includes a hollow tubular stem 114 having its rearward end portion snugly yet slidably and removably fitting the bore 89 in the measuring unit carrier 86 of the measurement indicating unit 12, are inclined flat spot 116 being provided therein (Figure 2) for engagement by the inner end of the coupling screw 102. Thus, the measuring unit carrier 86 serves as a chuck which interchangeably receives and holds different measuring units 16. The stem 114 is provided with a central bore 118 which extends from the rearward end thereof into a transverse bore 120 extending across the reduced diameter forward end portion 122. The portion 122 is of slightly less diameter than the bore 18, the concentricity of which is to be measured relatively to the bore in the gauge holding fixture (not shown) mentioned above, which snugly yet rotatably fits the enlarged diameter main part 126 of the stem 114.

Reciprocably mounted in the longitudinal bore 118 in the stem 114 is a forward motion-transmitting rod 128, the rounded rearward end of which engages the flat forward end of the rearward motion-transmitting rod 108 (Figure 2). Near its rearward end, the rod 128 is slotted or recessed as at 130 and the stem 114 near its rearward end is drilled and threaded transversely to receive a stop screw 132 which enters the recess 130 and limits the reciprocation of the forward motion-transmitting rod 128. The forward end 134 of the forward motion-transmitting rod 128 is pointed and conical, the conical surface 134 being engaged by the sharp edge 136 of a rectangular notch 138 formed in the side of a transverse cylindrical measuring pin 140 reciprocably mounted in the transverse bore 120 and having a rounded forward outer end 142 which engages the bore 18 for measuring the concentricity thereof. It will be evident from Figure 2 that the opposite end portions of the measuring pin 140 lying beyond the opposite ends of the notch 138 have bearing engagement with the opposite end portions of the transverse bore 120, thereby reducing wear and wobble of the measuring pin 140. In order to measure the extent to which the stem 114 will pass through the bore in the gauge-holding fixture (not shown) and thus determine the depth at which the measuring pin 140 will engage the bore 18 in the workpiece 22, the stem 114 is provided with a stop collar 144 which is bored axially at 146 to snugly but slidably receive the stem 114 and is bored and threaded radially as at 148 to receive a headless clamping set screw 150 by which the collar 144 is clamped at any desired location on the stem 114.

The modified measuring unit, generally designated 152, shown in Figure 5 is interchangeably attachable to the measurement indicating unit 12 shown in Figure 2 and is provided with a stem 154. The forward end portion 156 of the stem 154 is of substantially uniform diameter throughout the major portion of its length, whereas its rearward end portion 158 is of a diameter suitable for reception within the bore 89 in the measuring unit carrier 86 of the measurement indicating unit 12. The end portion 158 is similarly provided with an inclined flat side portion or recess 160 for receiving the end of the coupling screw 102. The stem 154 is bored longitudinally at 162 to receive, as before, a forward motion-transmitting rod 164, the rounded rearward end of which, as before, engages the flat forward end of the rearward motion-transmitting rod 108. The rearward end portion 158 of the stem 154 is drilled and threaded radially to receive a stop screw 166 engaging an elongated stop slot or recess 168 in the side of the motion-transmitting rod 164. The conical forward end 170 of the forward motion-transmitting rod 164 engages the sharp edge of one side of a slot 172 in a transverse pin 174 of slightly less length than the diameter of the forward end portion 156 of the stem 154, hence slightly shorter than the length of the transverse bore 176 in which it is reciprocably mounted in the end portion 156 of the stem 154.

Extending axially from the forward end 178 of the stem 154 into the transverse bore 176 is a hole 180 of elongated approximately flat-sided oval cross-section (Figure 7) having a groove 182 of V-shaped cross-section extending around the interior thereof (Figures 5 and 7). Snapped into the groove 182 is an approximately U-shaped hairpin spring 184 of circular cross-section, the inner edge of which engages the opposite sides of the rearward portion 186 of a pin 188, the reduced diameter rearward end 190 of which is threaded into a threaded socket 192 approximately midway between the opposite ends of the cross pin 174. Mounted on the reduced diameter forward end portion 194 of the pin 188 is a cross pin 196 having opposite rounded ends 198 and of a diameter adapted to fit the bore 200 in a workpiece 202, the stem 154, as before, being rotatably mounted in a bore of a fixture (not shown) coaxiall with the intended axis of the bore 200. Mounted on the stem 154 is a stop collar 144 identical with the collar 144 in Figure 2 and consequently having parts bearing the same reference numerals.

The measuring unit, generally designated 206, shown in Figure 6 is also almost identical with that shown in Figure 5 and similarly has a transverse pin 174 reciprocably mounted in the transverse bore 176. Threaded into the socket 192, however, is the reduced diameter rearward end 208 of a pin 210 having a spherical head or ball 212 on the forward end thereof engageable with a conical indentation 214, such as that made by a center drill, in a workpiece 216. The conical indentation 214 is, for example, used as a locating recess for subsequent drilling of the workpiece 216, and the ball 212 accurately checks its location relatively to its intended location.

In the operation of the bore concentricity gauge 10 of Figures 1 to 4 inclusive, the operator sets the stop collar 144 at the desired depth and inserts the stem 114 in the bore of the fixture mentioned above (not shown). The operator then grasps the hand grip 26 of the measurement indicating unit 12 in one hand and the knurled handle 80 in the other hand, inserting the reduced diameter portion 122 of the measuring unit 16 in the bore 18 of the workpiece 22. As the reduced diameter portion 122 enters the bore 118, the measuring pin end 142 is urged into engagement with the bore 18 by the thrust of the spring 50 transmitted through the quadrant 44 and measuring rods 108 and 128 to the measuring pin 140 by way of the engagement of the conical end 136 with the edge of the slot or recess 138 (Figure 2). Holding the hand grip 26 stationary with the dial indicator 14 conveniently visible, the operator rotates the handle 80 with his other hand, consequently rotating the measuring unit 16 and causing the rounded end 142 of the measuring pin 140 to trace out a circular line of contact with the bore 18.

As the reduced diameter end portion 122 of the stem 114 rotates within the bore 18 of the workpiece 22, any departure from concentricity of the bore 18 relatively to the bore in the holding fixture shifts the measuring pin 140 to and fro in its transverse bore 120. This motion resulting from a deviation of the bore from concentricity is transmitted backward by engagement of the edge of the recess 138 with the conical end 134 of the forward motion-transmitting rod 128 to reciprocate it and the rearward motion-transmitting rod 108. The latter consequently tilts the quadrant 44 around its pivot pin 42 and consequently reciprocates the pin 46 and dial indicator plunger 70, with the result that the needle 72 of the dial indicator 14 moves to and fro relatively to the graduated scale 74. The extent of shifting of the needle 72 on the scale 74 is a measure of the departure from concentricity of the bore 18 relatively to the reference bore in the holding fixture. In a similar manner, any irregularity in the bore 18 also shows up by the swinging of the needle 72 of the dial indicator 14 relatively to the scale 74 thereof. If the bore 18 is accurately concentric with the reference bore in the fixture, no swinging of the needle 72 occurs.

In the operation of the modified measuring unit 152 inserted in the bore 89 (Figure 5), the forward end portion 156 of the stem 154 is, as before, inserted in the bore of the above-mentioned fixture (not shown) to the depth permitted by the setting of the stop collar 144, whereupon the cross pin 196 enters the bore 200 to be checked for concentricity and its rounded end 198 engages the bore 200 in a circular line of contact as the handle 80 is rotated by the operator through a complete revolution. If the bore 200 is not concentric to the reference bore in the fixture with which it is intended to be coaxial, the crosspin 196 is moved transversely during rotation of the measuring unit 152, consequently shifting the transverse pin 174 in its bore 176. The transverse motion is, as before, converted into axial shifting of the forward motion-transmitting rod 164 by the engagement of the edge of the slot 172 with the conical tip 170, the resulting reciprocation of the rearward motion-transmitting rod 108 being converted, as before, into swinging of the needle 72 relatively to the scale 74. If the bore 200 is accurately concentric with the reference bore in the holding fixture, the needle 72 remains motionless as the handle 80 and measuring unit 152 is rotated.

In the operation of the further modified measuring unit 206 of Figure 6, the stem 154 is held, as before, in a fixed position in a reference bore in the above-mentioned fixture (not shown) relatively to the workpiece 210 while it is rotated by means of the handle 80, causing the ball 212 to engage the conical identation 214. If the conical indentation 214 is not exactly concentric with the axis of the holding fixture bore, the ball 212 will be shifted laterally by its engagement with the conical surface 214, consequently shifting the transverse pin 174 laterally in its bore 176 and, as before, transmitting this motion through the forward and rearward motion-transmitting rods 164 and 108 to the quadrant 44 and thence by way of the pin 46 and dial indicator plunger 70 to the needle 72 of the dial indicator 14. The swinging of the needle 72 relatively to the scale 74 of the dial indicator 14 indicates the departure from proper location of the conical indentation 214 which, as previously stated, may be the indentation made by a center drill. On the other hand, if the center indentation 214 is properly located, no transverse motion of the ball 212 occurs and the needle 72 of the dial indicator 14 remains stationary relatively to its scale 74 as the measuring unit 206 is rotated by means of the handle 80 while the hand grip 26 and support 24 are held stationary.

What I claim is:

1. A precision concentricity gauge for measuring the concentricity of a workpiece bore relatively to a reference bore, said gauge comprising a hollow support, a handle rotatably mounted on said support, a dial indicator mounted on said support, an elongated stem connected in coaxial relationship to said handle for rotation thereby, said stem having an external reference surface adapted to rotatably fit the reference bore, said stem having therein a longitudinal bore coaxial with the axis of rotation of said handle and a transverse bore disposed remote from said handle in communication with said longitudinal bore, a transversely-reciprocable measuring member reciprocably mounted in said transverse bore and having a workpiece bore-contacting feeler portion operatively connected thereto, and motion-transmitting mechanism extending from said measuring member through said support to said dial indicator and responsive to the transverse shifting of said measuring member by the engagement of said feeler portion during rotation of said stem relatively to said support by said handle as a result of eccentricity of the workpiece bore engaged by said feeler portion relatively to said reference surface of said stem.

2. A precision concentricity gauge, according to claim 1, wherein said dial indicator is mounted on said support transversely to the axis of rotation of said handle.

1, wherein said handle includes a sleeve disposed in tele-

3. A precision concentricity gauge, according to claim 1, wherein said handle includes a sleeve disposed in telescoped coaxial relationship with a portion of said support.

4. A precision concentricity gauge, according to claim 1, wherein said handle has a divided scale extending at least partially therearound and wherein an index element is mounted on said support in registry with said scale.

5. A precision concentricity gauge, according to claim 3, wherein a portion of said sleeve has a divided scale extending at least partially therearound and wherein an index element is mounted on said support in registry with said scale.

6. A precision concentricity gauge, according to claim 1, wherein a chuck is rotatably mounted on said support and operatively connected to said handle, and wherein said stem is removably engageable with said chuck.

7. A precision concentricity guage, according to claim 6, wherein a coupling element extends between and drivingly interconnects said handle and said chuck.

8. A precision concentricity gauge, according to claim 7, wherein said coupling element also is movable into and out of clamping engagement with said stem.

9. A precision concentricity gauge, according to claim 1, wherein said feeler portion is mounted on one end of said measuring member.

10. A precision concentricity gauge, according to claim 1, wherein said feeler portion comprises an elongated member connected to said measuring member intermediate the opposite ends thereof and with its axis disposed substantially perpendicular to the axis of said measuring member.

11. A precision concentricity gauge, according to claim 10, wherein said elongated member includes a bore-contacting cross portion disposed at the end thereof remote from the connection thereof with said measuring member.

12. A precision concentricity gauge, according to claim 10, wherein said elongated member includes a ball-shaped head disposed at the end thereof remote from the connection thereof with said measuring member.

References Cited in the file of this patent

UNITED STATES PATENTS

| | | |
|---|---|---|
| 1,416,964 | De Leeuw | May 23, 1922 |
| 2,312,222 | Tanner | Feb. 23, 1943 |
| 2,547,364 | Boat | Apr. 3, 1951 |
| 2,557,840 | Preslan | June 19, 1951 |
| 2,697,282 | Eisele | Dec. 21, 1954 |
| 2,702,946 | Boat | Mar. 1, 1955 |
| 2,766,532 | Eisele | Oct. 16, 1956 |
| 2,831,258 | Eisele | Apr. 22, 1958 |

FOREIGN PATENTS

| | | |
|---|---|---|
| 424,782 | Italy | Sept. 2, 1947 |